United States Patent Office 3,485,752
Patented Dec. 23, 1969

3,485,752
METHOD FOR THE REMOVAL OF SUSPENDED
MATTER IN WASTE WATER TREATMENT
John C. Eck, Convent, and William C. Zegel, Mendham,
N.J., assignors to Allied Chemical Corporation, New
York, N.Y., a corporation of New York
No Drawing. Filed Sept. 27, 1967, Ser. No. 671,119
Int. Cl. C02b 1/20
U.S. Cl. 210—54                                    9 Claims

ABSTRACT OF THE DISCLOSURE

A nonionic synthetic organic latex is effective at flocculating suspended organic or inorganic matter in water whereby said suspended matter is readily separated from the water.

These latices are water-based emulsion formed by the free radical-induced emulsion polymerization of olefins or dienes in the presence of water and a nonionic organic emulsifying agent.

Field of the invention

This invention relates to a process for the purification and clarification of water. More particularly, this invention relates to a process for removing contaminating insoluble suspended matter from water by flocculation. Still more particularly, it relates to the use of a nonionic synthetic organic latex to flocculate and produce settling of finely divided organic and inorganic solids suspended in water in preparation for the use or reuse of said water or its discharge to receiving surface waters.

Description of the prior art

Water used in such industrial operations as paper-making, petroleum refining, secondary recovery of petroleum by water flooding, hydroelectric plants, atomic energy operations, metal plating, boiler plants and the like, must be relatively free of suspended matter. Clarification of naturally occurring water is necessary prior to its use in operations of this type in many instances. Additionally, one of the most difficult industrial problems is the clarification, prior to discharge of industrial waste water which would otherwise create a nuisance and cause pollution of lakes and streams. Examples of such waste waters are sulfate mine waters, coal washing waters, paper or pulp waste waters, clay slimes from aqueous solutions resulting from the benefication of uranium, potash, aluminum and other ores by hydrometallurigical processes, calcium carbonate suspensions and other suspensions of finely divided solids in water which result from industrial processes such as mining, washing and the like. Such suspensions will frequently remain stable for many days. Likewise, in the treatment of industrial process water prior to reuse, it is frequently necessary that suspended particles be removed.

The expeditious and effective removal of suspended organic and inorganic material from water thus forms an essential step in many plant operations. New and improved processes for used water renovation and upgrading natural water, particularly for the removal of insoluble suspended matter from water, are therefore, needed.

Various methods are currently used for the removal of insoluble contaminants from water, and in these methods flocculation procedures are rather extensively employed. As used herein, the terms flocculating agent, coagulating agent, flocculant and coagulant are synonymous, likewise the terms flocculation and coagulation.

Flocculation procedures depend upon the use of compounds known as coagulants or flocculants, to remove suspended matter from contaminated water by the formation of a floc comprising the flocculant and the suspended matter. The water containing the floc may then be passed through flocculator units to enlarge the floc and then into settling basins where most of the flocculated suspended matter can be separated from the water by decantation or filtration.

The desired goal in a flocculation procedure is to obtain the maximum degree of removal of suspended matter with the minimum expenditure of money for flocculants and treatment facilities. It is therefore, desirable that the flocculant be effective for the removal of the suspended matter with the use of a minimum amount thereof. It is also desirable that the floc settle relatively rapidly and that the floc be relatively tough in order that it will not break up or disintegrate while the water containing it is being conveyed to a settling basin, filter bed or other separation means.

Alum and iron salts are currently used extensively in clarifying raw and waste water supplies of many types, particularly in municipal water clarification and in the clarification of water supplies used in industrial processes. Quite frequently it is necessary to use extremely large dosages of alum or iron salts to clarify such waters.

Serious investigators of the mechanism by which alum coagulates suspended matter in water have determined that the alum functions in a dual role insofar as it must first neutralize the charges associated with the surface of the suspended particles, which charges tend to keep these particles in suspension. Once the particle charges have been neutralized, which point is generally called the isoelectric point, it has been postulated that additional amounts of alum are necessary to provide a voluminous, sticky surface on which to absorb the neutralized particles and produce a floc with sufficient density to settle rapidly. Thus, in some cases, it is necessary to use as much as 500 p.p.m. of alum to effectively coagulate a turbid water, with the larger part of the alum acting in the function of a binder or a coalescer for the neutralized particles. When such large quantities of alum are used to coagulate the suspended matter in such waters, undesirable decreases in pH's sometimes occur, and the cost of treatment becomes excessive.

The need for flocculating agents which would not cause this pH decrease has long been realized. Natural organic substances such as animal glues, vegetable gums, agar and starches have been employed with moderate success. The limited pH range in which such agents may be effectively used, the criticality of the amounts that must be added to the suspensions, the difficulties encountered in storage due to spoilage, and the accompanying variations from specifications due to changes during storages are definite disadvantages to their use and prevent their wide acceptance.

Within recent years numerous journal articles and patents have appeared containing teachings to the effect that suspensions of organic and inorganic solids can be flocculated and settled to effect clarification thereof through the use of appropriate synthetic organic polymer resins. In general, water soluble polymers of various types such as polyacrylamide, polymethacrylic acid and polyvinyl pyrrolidone have been used. While good results have been achieved in a few instances, polymer promoted flocculation processes, as presently practiced, usually require large doses of polymer and are therefore uneconomical for large scale clarification operations such as those required for most municipal and industrial waste streams.

Additional disadvantages of the current processes of chemical treatment of water containing suspended organic or inorganic matter include: (1) slowness of removal of coagulant flocs from the treated water with a consequent need for costly large size treating and settling tanks; (2) inefficiency in the removal of very finely divided suspended matter; (3) relatively low purity of the treated water; and (4) relatively high volume of sludge produced per unit volume of water treated.

Generally, suspensions comprise negatively charged particles and the flocculants hitherto most often used are cationic in nature. However, much of the cationic coagulant may not be effective as such since it is used up in charge neutralization and not in flocculation as such. Even in the chemical coagulation of solids in raw water supplies, wherein the suspended solids content is generally only a few parts per million, acceptable clarification has hitherto been achieved only by using relatively large and expensive treating equipment and excessively large amounts of chemical coagulant per unit amount of suspended solids removed. Additionally, some suspensions are positively charged or essentially neutral. With suspensions of this latter type, the cationic flocculating agents hitherto generally used have been of very limited effectiveness.

It may be said, therefore, that to date no really satisfactory chemical clarifying agent or chemical process for removing suspended organic or inorganic matter from aqueous liquors at acceptable cost has been developed. It would, thus, be desirable to provide an efficient flocculation process whereby more complete and rapid separation of disperse organic and inorganic solids from aqueous media is achieved with an organic polymeric flocculant.

Summary of the invention

It is an object of the invention to provide an economical process for removing from raw water used for municipal or industrial purposes and from industrial process and waste water a portion of the suspended and settleable solids contained therein.

It is a further object of this invention to provide a novel type of clarifying agent for the treatment of such water, which type of clarifying agent causes rapid flocculation and sedimentation of the suspended solids therein and thereby makes said solids adapted for easy and rapid removal at low cost, in treating mechanisms of simple design and modest size.

Another object of the present invention is to provide a new and improved method for coagulating and producing settling of finely divided, predominantly inorganic solids from relatively dilute suspensions thereof in water.

Another object of the invention is to provide a process for treating inorganic aqueous suspensions in which a relatively small amount of added substance will produce a uniform floc and settling of the finely divided suspended solids without introducing into the water substances which have a harmful effect on industrial processes or cause harmful pollution of streams.

Further objects and advantages will become apparent from the description of the invention which follows in greater detail.

These and other objects are accomplished in accordance with this invention wherein water containing suspended matter is treated with a nonionic synthetic organic latex flocculating agent. The latices of this invention are found to promote the flocculation of the suspended matter whereby it is readily separated from the water by conventional means.

Our copending application Ser. No. 646,188, filed June 15, 1967, discloses the use of synthetic organic cationic and anionic latices as flocculating agents for suspended organic and inorganic matter in water. It has now been found in accordance with the instant invention that nonionic synthetic organic latices are also effective flocculating agents in the treatment of aqueous suspensions.

The decision as to whether to use a nonionic, anionic or cationic latex to flocculate the suspended matter in the water being treated depends on the nature and concentration of the suspended matter. As has heretofore been indicated, most suspensions are at least partly colloided in nature and, hence, are negatively charged. However, many suspensions are electrostatically neutral or positively charged. We have found that the nonionic latices of the instant invention are generally superior flocculants for such neutral or positively charged suspensions. However, the nonionic latices will also flocculate negatively charged suspensions although an ionic latex is generally more effective.

The nonionic latex treatment process of this invention has been found to be particularly adapted to the treatment of aqueous inorganic industrial process and waste water suspensions of the type encountered in coal washing and ore processing operations and aqueous suspensions of chlorinated polyethylene and polyvinyl chloride.

The determination of the preferred chemical type of latex flocculant, i.e., cationic, anionic or nonionic, for any particular suspension is best done emperically. One means of doing this is to place three samples of the aqueous suspension to be treated in individual beakers and agitate the samples at a uniform rate while adding to the three agitated samples an equivalent dosage of an anionic, a cationic and a nonionic latex, respectively. After addition of the latex is complete, agitation of the samples is terminated and the treated suspensions are allowed to stand quiescent for a given period. The turbidity of each of the treated samples is then determined. The type of latex affording the lower turbidity is the type preferred for treating the particular suspension. The particularly preferred latex within a given chemical type for treating a given suspension may likewise be determined by similar comparative tests.

In general, the same advantages accrue from the use of a nonionic latex as from the use of a cationic or anionic latex when compared with the flocculating agents known to the prior art. One of the foremost advantages is the production of a fast settling floc. This advantage is particularly important since it makes it possible either to increase the amount of contaminated water undergoing treatment or to treat a given quantity of water in a shorter period of time when a nonionic latex coagulant is used as herein described, and thus, the economy of the clarification operation is greatly improved. Also, the use of a latex coagulant results in the production of a tougher, relatively difficultly disintegrated floc. This advantage is of importance when the water containing the floc is conveyed to a filter or other separation means. The floc tends to remain in an integrated form and as such it is readily separated from the water. Also, it is generally possible to employ a lesser amount of the latex coagulant than of an inorganic coagulant to effect the equivalent degree of clarification of the water. This advantage makes use of the latex flocculant economically desirable. It is also obvious that by the use of an organic rather than an inorganic coagulant, the content of dissolved solids and the conductivity of the treated water are reduced, making the water of better quality for numerous commercial uses. With some waters use of a latex coagulant improves the taste of the treated water, reducing or eliminating its astringent quality.

The aqueous suspensions of organic or inorganic solids suitable for processing in accordance with the invention can vary in solids content over a wide range. Water containing up to 20,000 or more p.p.m of suspended organic or inorganic matter may suitably be treated according to this invention.

The optimum dosage of nonionic latex coagulant for any particular aqueous suspension to be treated is distinctly an individual problem and can be best determined even as the particularly preferred latex by actual comparative tests (see Babbitt and Baumann, "Sewerage and Sewage Treatment," Eighth edition, John Wiley and Sons, Inc., New York, 1958, page 449; and "Water Works and Sewerage," 81,358 (1938). However, we have generally found that suitable concentrations of nonionic latex of the type herein described lie in the range of from about 0.1 to about 50 parts of latex per million parts of aqueous liquid to be treated, and quite generally in the range below about 10 parts of latex per million parts of aqueous liquor to be treated when the suspended matter is substantially organic. For substantially inorganic suspensions the preferred treating level is from about 20 to about 50 parts of cationic latex per 1000 parts of suspended matter.

For exceptionally high concentrations of suspended matter, either organic or inorganic, a greater dosage of latex of up to 1000 p.p.m. may advantageously be used.

It will be appreciated by those skilled in the art that the ranges discussed in the above paragraphs are determined largely by economic particability and that some degree of reaction can be obtained over a wide range of conditions including conditions outside the above-described limits.

The process of the present invention may be successfully used concomitantly with various standard methods of industrial waste water treatment in which a digestion, settling or filtration step or combination thereof is used.

In carrying out the process of our invention, the nonionic latex flocculant is added tot he aqueous suspension, preferably with agitation, whereby a uniform distribution of the nonionic latex flocculating agent throughout the suspension is accomplished quickly but without such turbulent agitation as to degrade any flocs building up immediately upon the addition of the flocculant.

Length of the period of agitation is dependent upon several variables, such as the design of the equipment, the clarification desired, the coagulant employed, the amount of coagulant used, and the like. The preferred period varies from about 10 to about 60 minutes, but in some instances the desired degree of clarification can be obtained by agitating the mixture for a period of less than 10 minutes.

After the period of agitation, the latex-treated suspension is allowed to stand either quiescent or with very mild agitation for a period sufficiently long to permit concentration of the floc into a substratum. Standing for from about 2 to 30 minutes is ordinarliy sufficient. The floc may then be separated from the aqueous dispersing medium by any convenient and known separatory technique. Such a technique can involve one or a combination of operations such as sedimentation, decantation, filtration, centrifugation and flotation.

In order to be satisfactory for use in conventional industrial waste water clarification equipment, the floc produced from water containing suspended matter by treatment with a coagulant should have the ability to settle from the water in a period of time of five minutes or less under conditions of normal jar testing using 1000 ml. samples of aqueous susepnsion in 1.5 liter beakers. Flocs which take longer than this to settle are not considered suitable from the standpoint of effectively utilizing conventional clarification equipment. While the period of time set above is considered as being standard for most of the water treatment industry, the flocs produced in accordance with the instant invention, however, are generally capable of settling in periods of time ranging from 30 seconds to about three minutes, based on jar test observations. The flocs produced in accordance with this invention are also less fragile; hence, they are less subject to breaking or flaking, such as is the case when prior art coagulants such as alum are used.

The term "nonionic synthetic organic latex," as used herein, contemplates a water-based emulsion formed by the free radical induced emulsion polymerization of $C_2$ to $C_{30}$ olefins, $C_4$ to $C_{30}$ dienes, or halogen, ester or aryl substituted olefins or dienes of the above chain length or mixtures thereof with each other or with up to an equimolar amount of aliphatic dithiols in the presence of water and a nonionic organic emulsifying agent. Alternatively, a combination of nonionic emulsifying agents may be used. The only limitation on the choice of monomer or comonomers from the above-denominated group is that the resultant polymer or copolymer must be water insoluble.

Suitable olefins and substituted olefins include, for example, ethylene, propylene, butene, pentene, heptene, octene, decene, dodecene, heptadecene, eicosene, docosene, tricosene, styrene, vinyl chloride, methallyl alcohol, ethyl and methyl acrylate and methacrylate, vinyl acetate, acrylonitrile, vinylidene chloride and isopropenyl toluene. Suitable dienes include butadiene, isoprene, dimethyl butadiene, cyclopentadiene, chloroprene and biallyl. The preparation and characteristics of a variety of such latex emulsions are described in "Synthetic Rubber," G. S. Whitley, ed., J. Wiley & Sons, N.Y., 1954, at 224 et seq. and in Sorenson & Cambell, "Preparative Methods of Polymer Chemistry," Interscience, N.Y., 1961.

Particularly preferred results are obtained when conjugated dienes or halogen-substituted conjugated dienes such as butadiene, chloroprene, cyclopentadiene, dimethyl butadiene and monomethyl butadiene (isoprene) are used to prepare the latex.

Additionally, the olefin, diene or mixture thereof may be copolymerized with up to 50% by weight of nitrogen-containing olefinic comonomer in the presence of a suitable emulsifying agent and water. Preferably about 5 to 10 weight percent of the nitrogen-containing comonomer is used.

Illustrative examples of suitable nitrogen-containing comonomers include acrylonitrile, methacrylonitrile, vinylidene cyanide, N-vinylpyrrolidone, dimethylaminoethyl acrylate, olefinic amines of the formula

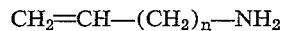

$$CH_2=CH-(CH_2)_n-NH_2$$

wherein $n$ ranges from 1 to 20, dimethylaminopropyl methacrylamide, vinyl oxazolines and oxazines and $C_2$ to $C_{20}$ N-alkyl acrylamides, maleamides, maleimides and the like.

From about 1 g. to about 5 g. of water is preferably present per gram of olefin or diene being polymerized.

The polymerization may be effected at any temperature from about $-10°$ C. to about $+80°$ C. depending upon the activation temperature of the particular catalyst selected.

Suitable free radical catalysts include, for example, peroxy compounds such as ammonium and alkali metal persulfates (peroxy disulfates), barium peroxide, hydrogen peroxide and organic peroxides such as tertiary butyl hydroperoxide, cumene hydroperoxide acetyl peroxide, t-butyl-isopropylbenzene hydroperoxide, and benzoyl peroxide, peracids such as peracetic acid and perbenzoic acid, uranyl acetate in the presence of light and the like. In addition, other non-peroxide free radical catalysts such as azobis-isobutyronitrile may be suitably employed. Normally, from about 0.05 g. to about 1.0 g. of catalyst is used per 100 g. of monomer.

Catalyst reactivity may be enhanced by the concomitant use of so-called modifiers or redox system additives such as hydroquinone, lactose, glucose, dihydroxyacetone, sodium hydrogen phosphate, sodium bisulfate, thiosulfate and metabisulfite, copper sulfate, ferrous ammonium sulfate, sodium pyrophosphate/ferric sulfate/cobalt chloride mixture and the like. Use of inorganic redox system additives is particularly desirable when the catalyst is substantially water insoluble. Under these circumstances the polymerization is carried out at a temperature below the activation temperature, in the absence of the redox additive, of the water insoluble catalyst which is in the organic monomer phase, thereby avoiding nonemulsion bulk polymerization of the organic monomer. Chain terminators such as dodecyl mercaptan may also be used to control the configuration and size of the polymer.

Any of a wide variety of known nonionic organic emulsifying agents may be used to prepare the latices of the instant invention, either alone or in combination with other nonionic emulsifiers. The specific kind and quantity of emulsifying agent used will depend upon the nature of the monomer or monomers present and upon other characteristics of the reaction medium and conditions of polymerization. From about 2 g. to about 10 g. of emulsifying agent is generally used per 100 g. of monomer.

Illustrative examples of suitable nonionic emulsifying agents are polyethoxylates $C_7$ to $C_{30}$ alkyl phenols, polyethoxylated $C_7$ to $C_{30}$ fatty acids and fatty alcohols, $C_7$ to $C_{30}$ alkylphenoxy polyethyleneoxy ethanols, polyethoxylated vegetable oil and $C_7$ to $C_{30}$ fatty acid amides of $C_2$ to $C_6$ alkanol amines.

Preferred emulsifying agents are the $C_7$ to $C_{30}$ alkylphenoxy polyethyleneoxyethanols. Particularly preferred emulsifying agents include the above wherein the alkyl group is $C_8$ to $C_{13}$. The emulsifier must be soluble in water to the extent of at least about 2% by weight. Increasing the length of the alkyl groups present in the emulsifier molecule tends to reduce its water solubility while increasing the number of ethoxyl groups present increases water solubility. The skilled artworker can readily select the proper degree of ethoxylation commensurate with alkyl group chain length to achieve at least the minimum requisite degree of water solubility.

The invention can be more fully understood by reference to the following examples. All parts are parts by weight unless otherwise expressly noted.

Examples 1–3 demonstrate the effectiveness of the nonionic butadiene latices of the instant invention as flocculating agents for various types of aqueous suspensions.

Examples 4–25 describe the preparation of additional suitable nonionic latices.

EXAMPLE 1

A series of butadiene latices were prepared. The latices were prepared by adding an aqueous solution of the emulsifier to a glass pressure vessel and then freezing the solution. Then the potassium persulfate catalyst and potassium bisulfite initiator, if any, are added and liquid butadiene (butadiene liquifies on cooling to −4° C.) are added. A small quantity of butadiene was allowed to vaporize and escape from the vessel to purge it of air and the pressure reaction vessel was then sealed and heated to the desired temperature with agitation for a given period of time. The quantities of reactants and reaction time and temperature for four different syntheses are given in Table I.

TABLE I

| Run | 1 | 2 | 3 | 4 |
|---|---|---|---|---|
| $H_2O$, g | 150 | 180 | 180 | 180 |
| $K_2S_2O_8$, g | 0.21 | 0.32 | 0.4 | 0.4 |
| $K_2S_2O_5$, g | 0.07 | 0.1 | None | None |
| Butadiene, g | 50 | 50 | 50 | 50 |
| Emulsifier, g | 5.0 | 5.0 | 3.0 | 5.0 |
| Reaction temperature, °C | 30 | 32 | 50 | 50 |
| Reaction time, hrs | 16 | 16 | 16 | 72 |

The emulsifier used in Runs 1–3 was nonylphenoxy triethyleneglycol. The emulsifier used in Run 4 was stearoyl ethanolamide.

EXAMPLE 2

The latices of Example 1 were tested as flocculants for waste wash water from a soft coal mine. The test procedure utilized was as follows:

(a) add 800 ml. of waste water to 1000 ml. beaker
(b) stir at 100 r.p.m. with 3″ x 1″ paddle
(c) add latex
(d) continue stirring at 100 r.p.m. for 1 min. after addition
(e) stir at 60 r.p.m. for 10 min.
(f) stop stirring
(g) measure floc settling time.

The following results were achieved with 8 p.p.m. (based on water) of the latices of Example 1.

| Latex No.: | Settling time, ft./hr. |
|---|---|
| 1 | 50 |
| 2 | 35 |
| 3 | 325 |
| 4 | 30 |

These four latices were also effective at flocculating the suspended matter in aqueous suspensions of polyvinyl chloride and chlorinated polyethylene.

EXAMPLE 3

A neutral clay slurry was produced by digesting Kaolin clay with aqueous sulfuric acid. Portions of this slurry were treated with emulsion number 2 of Example 1, and with a variety of commercially available anionic and cationic flocculants. The emulsion caused substantial floc formation and effected an appreciable clarification of the slurry. None of the commercial cationic or anionic flocculants tested had any substantial coagulative effect on the slurry.

EXAMPLE 4

Emulsion polymerization of styrene with persulfate

In a glass pressure vessel is placed 100 g. of water, 0.05 g. of potassium persulfate, 0.05 g. of sodium hydrogen phosphate and 1.0 g. of tetraethoxy dodecylphenol. When this mixture has become homogeneous, 50 g. of styrene is added. Nitrogen is bubbled through the mixture to displace the air and disperse the styrene. The vessel is then capped and sealed. It is maintained with intermittent agitation at 70° C. for 2 hours and then at 95° C. for an additional 2 hours. The product, a milky white free-flowing latex, is removed after cooling the reaction vessel to room temperature.

This latex is effective as a coagulant for inorganic and organic aqueous suspensions.

EXAMPLE 5

Emulsion polymerization of vinylidene chloride

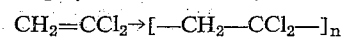

In a 1-liter, 3-necked flask equipped with a nitrogen inlet, a condenser and a stirrer is placed 100 g. of vinylidene chloride, and 300 ml. of an aqueous solution containing 3 g. of ammonium persulfate, 1 g. of sodium hydroxide, 1.5 g. of sodium thiosulfate and 3 g. of tetraethoxylated soy bean oil. The air in the reaction vessel is displaced with nitrogen, and the mixture is stirred for 6 hours at 30° C. At this time polymerization is essentially complete and the polymer latex product is removed from the reaction vessel.

This latex is effective as a coagulant for inorganic and organic aqueous suspensions.

EXAMPLE 6

Emulsion polymerization of styrene with hydrogen peroxide

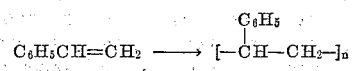

A mixture of 100 g. of styrene, 250 ml. of water, 1 g. of diethoxylated nonylphenol and 0.2 g. of 30% hydrogen peroxide is stirred vigorously under nitrogen in a round-bottom flask. The mixture is heated for 12 hours at 80° C. An essentially quantitative yield of polymer latex product is obtained.

This latex is effective as a coagulant for inorganic and organic aqueous suspensions.

EXAMPLE 7

Emulsion polymerization of vinyl chloride with hydrogen peroxide

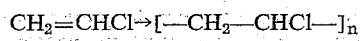

One liter of distilled water, 50 g. of dodecylphenoxy triethyleneglycol and 5.5 g. of 30% hydrogen peroxide is placed in a glass-lined stainless steel autoclave and cooled with Dry Ice. About 500 g. of vinyl chloride is not condensed into the reaction vessel from a cylinder. The mixture is then warmed to a temperature of between 40°–50° C. and maintained there for 20 hours. At this point polymerization is complete and the vessel is cooled to room temperature and the polymer latex product removed therefrom.

This latex is effective as a coagulant for inorganic and and organic aqueous suspensions.

EXAMPLE 8

Emulsion polymerization of acrylonitrile

A 500 ml. 3-necked flask is fitted with a nitrogen inlet, a stirrer and a reflux condenser. The flask is placed in a bath maintained at about 35° C. and flushed for 15 min. with nitrogen. The 120 ml. of freshly boiled distilled water is added, stirring is started and the nitrogen flow is reduced to a very slow rate over the surface. To the flask is now added sequentially 2 g. of tetraethoxy docosyl alcohol, 80 g. of inhibitor-free acrylonitrile, 0.1 g. of potassium persulfate and 0.1033 g. of sodium bisulfite. Polymerization is complete within approximately 3 hours and a nearly quantitative yield of product is obtained as a stable dispersion. The particles are nearly spherical with a diameter of approximately $0.1\mu$.

This letex is effective as a coagulant for inorganic and organic aqueous suspensions.

EXAMPLE 9

Emulsion polymerization of vinyl acetate

The polymerization is carried out in a 2 l. round-bottom flask equipped with a reflux condenser, mechanical stirrer nitrogen inlet and thermometer. The charge consists of 200 g. of vinyl acetate purified by distillation, 400 g. of water, 10 g. of hexaethoxylauric acid, 0.5 g. benzoyl peroxide, and a redox system consisting of 1.4 g. of ferrous ammonium sulfate hexahydrate and 6 g. of sodium pyrophosphate decahydrate. The flask is maintained at approximately 40° C., and the reaction mixture is blanketed with nitrogen. After approximately 1 hour reaction is complete, and the latex product in substantially quantitative yield is removed from the flask.

The latex is effective as a coagulant for inorganic and organic aqueous suspensions.

EXAMPLE 10

Emulsion polymerization of butadiene

Into a steel pressure vessel was placed 63 g. of water and 1.75 g. of the lauric acid amide of ethanol amine. The vessel and its contents were cooled to −20° C. and 25 g. of butadiene, 0.105 g. of potassium persulfate and 0.2 g. of dodecyl mercaptan added. The system was purged of air by allowing 5 g. of butadiene to escape and then sealed. After 16 hours of agitation at 50° C. the vessel was vented and the polymer latex product removed.

This latex is effective as a coagulant for inorganic and organic aqueous suspensions.

EXAMPLE 11

A mixture of 150 ml. of water, 2.5 g. of sodium lauryl sulfate and 2.5 g. of diethoxy heptyl phenol were placed in a glass pressure vessel of 250 ml. capacity and cooled to −2° C. Then 65 g. of butadiene and 0.3 g. of potassium persulfate were added, and the system then purged by allowing 5 g. of butadiene to escape and sealed. After 16 hours of agitation at 50° C., the system was vented and the polymer latex product removed.

This latex is effective as a coagulant for inorganic and organic aqueous suspensions.

EXAMPLE 12

Emulsion copolymerization of vinyl chloride and vinyl acetate

In a glass polymer tube is placed 100 ml. of water, 5 g. of octylphenoxy diethyleneglycol, 0.25 g. of ammonium persulfate and 0.1 g. of sodium bisulfite. The mixture is cooled below the boiling point of vinyl chloride (−14° C.) with a Dry Ice acetone bath. Then 5 g. of vinyl acetate and 45 g. vinyl chloride measured by first condensing into a graduated vessel, are introduced into the polymer tube which is flushed with nitrogen and sealed. The tube is allowed to warm to 40° C. and agitated at this temperature for 2 hours. After cooling in ice water, it is opened and the polymer latex product removed.

This latex is effective as a coagulant for inorganic and organic aqueous suspensions.

EXAMPLE 13

Emulsion copolymerization of vinyl chloride and vinylidene chloride

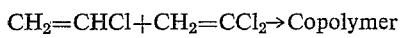

A mixture of 500 ml. of water, 4 g. of decylphenoxy tetraethylene glycol, 3 g. of 30% hydrogen peroxide and 0.5 g. of acid ammonium phosphate is mixed in a 1 l. stainless steel autoclave with 42 g. of vinylidene chloride and 126 g. of vinyl chloride measured from a pressure cylinder. The autoclave is then sealed and heated with agitation for 20 hours at 48° C. Polymerization is complete at the end of this period and the polymer latex product is removed after cooling to room temperature.

This latex is effective as a coagulant for inorganic and organic aqueous suspensions.

EXAMPLE 14

Into a 1 l. stainless steel autoclave was placed 150 cc. of distilled water, 6.5 g. of octethoxy tricosyl alcohol and 1.0 g. of potassium persulfate and the autoclave then pressurized to 1600 p.s.i.g. with ethylene. Then vinyl chloride was added until the gas pressure reached 7500 p.s.i.g. The autoclave was agitated for 16 hours at 50° C., after which it was cooled to room temperature, vented and the polymer latex product removed.

This latex is effective as a coagulant for inorganic and organic aqueous suspensions.

EXAMPLE 15

This example illustrates the preparation of a butadiene latex.

A mixture of 180 g. of distilled water, 0.3 g. of potassium persulfate ($K_2S_2O_8$) catalyst and 4.5 g. of triethoxylated stearic acid emulsifier was mixed in a stainless steel reactor and frozen. Then 85 g. of 1,3-butadiene was added. The reactor was sealed and heated to 50° C. and maintained at this temperature with agitation for 16 hours. On cooling to room temperature and venting, 244 g. of a free-flowing emulsion was obtained. Similar emulsions were prepared using butadiene and 1-hydroxyethyl-2-glyoxaladine hydrochloride, ethoxylated stearylamine hydrochloride, 2-lauryl imidazoline acetate, 1-aminoethyl-2-glyoxaladine acetate and lauryldimethylbenzyl ammonium chloride as emulsifiers.

These latices are effective as coagulants for inorganic and organic aqueous suspensions.

EXAMPLE 16

Preparation of poly (hexamethylene thioether) cationic latex

A mixture of 12.30 g. (0.0819 M) hexamethylenedithiol and 6.72 g. (0.0819 M) biallyl, both freshly distilled, is prepared and stored in a nitrogen-filled, 10-oz. screw cap bottle. 50 ml. distilled water and 1 g. of octethoxylated rope seed oil is added to the mixture of monomers, using a nitrogen line at the mouth of the bottle to keep air out. The bottle is capped and cooled to about 5° C. in an ice bath.

A catalyst solution is prepared no more than 5 hours before the polymerization from the following, using 2.5 ml. of each solution: 1.46 g. ammonium persulfate in 20 ml. distilled water; 0.37 g. sodium metabisulfite in 10 ml. distilled water; 0.37 g. copper sulfate (hydrate) in 100 ml. distilled water. The catalyst mixture is added, again using a nitrogen line for the exclusion of air, and the bottle is capped tightly and tumbled in a constant temperature bath maintained at 30° C. This may be accomplished by wiring the bottle very firmly to the end of a metal stirrer shaft which is then placed in the bath at an acute angle so that the bottle is turned mainly end-over-end. After 24 hours the resultant emulsion is removed.

This latex was effective as a coagulant for inorganic and organic aqueous suspensions.

EXAMPLE 17

Emulsion polymerization of vinyl chloride with persulfate $$CH_2=CHCl \rightarrow [-CH_2-CHCl-]_n$$

To a well-jacketed, glass-lined autoclave (13.5 m.³ capacity) equipped with an agitator, 6000 l. of pure water, 100 l. of the myristic acid amide of diethanolamine and 100 l. of a 1% aqueous potassium persulfate solution is charged. The reaction vessel is sealed and evacuated, then 1800 l. of vinyl chloride is pumped in. Water is circulated in the jacket of the polymerization vessel and polymerization is allowed to proceed. Samples are withdrawn at regular intervals and the density of the polymer dispersion is measured. When the density reaches 1.024, an additional 380 l. of vinyl chloride is pumped in. The polymerization reaction is exothermic and great quantities of heat have to be dissipated through the walls of the polymerization vessel to the cooling medium in the jacket. In order to obtain better heat transfer once the polymerization begins, refrigerated brine is circulated in the cooling jacket at about −20° C. Very accurate control of the temperature of the reaction is necessary since the molecular weight is extremely sensitive to variation in temperature. High molecular weight material is obtained with internal temperatures of 48–50° C. The emulsion product is free flowing.

This latex is effective as a coagulant for inorganic and organic aqueous suspensions.

EXAMPLE 18

Emulsion polymerization of acrylonitrile/butadiene

A 500-ml. three-necked, round-bottom flask is fitted with a nitrogen inlet, a stirrer and a reflux condenser. The flask is thermostaticaly controlled in a bath at about 25° C. and flushed for 15 min. with nitrogen. Then 120 ml. of freshly boiled distilled water is added, stirring is started and the nitrogen flow is reduced to a very slow rate over the surface. To this flask is now added, in order, 2 g. of eicosylphenoxy hexaethylene glycol, 20 g. of acrylonitrile freed of inhibitor, 60 g. of butadiene, 0.1 g. of potassium persulfate and 0.033 g. of sodium bisulfate. Evidence that the polymerization has started is the appearance of a milkiness, usually in about 5–20 min. If the milkiness does not appear within about 1 hour, an additional amount of persulfate initiator and bisulfate activator may be added. Once begun, polymerization is usually complete in 2–3 hours. However, a small additional yield may be obtained by stirring it overnight. A nearly quantitative yield of polymer is obtained as a stable aqueous emulsion. The particles are nearly spherical with a diameter of approximately 0.1μ.

This latex is effective as a coagulant for inorganic and organic aqueous suspensions.

EXAMPLE 19

Emulsion polymerization of methyl acrylate

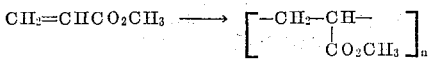

A three-necked flask is fitted with a stirrer, a reflux condenser and a thermometer. The flask is charged with 400 ml. of water, 20 g. of hexaethoxylated corn oil and 1 g. of 30% hydrogen peroxide. The solution is stirred slowly and 200 g. of distilled methyl acrylate is added. Heat may be applied to the reaction vessel in order to initiate polymerization. If polymerization does not start within 10 min. after refluxing has occurred, additional hydrogen peroxide may be added. If excessive quantities are required, the monomer is not of sufficient purity. Once initiated, the polymerization usually proceeds at a rate sufficient to cause refluxing without external heating for 15–30 min. After about 30 min. heat is applied, and the refluxing temperature is allowed to rise until it is about 95° C., at which point the polymerization may be considered to be complete. The product is obtained quantitatively as a free-flowing emulsion.

This latex is effective as a coagulant for inorganic and organic aqueous suspensions.

EXAMPLE 20

Preparation of an emulsion of a copolymer of acrylonitrile and isopropenyl toluene

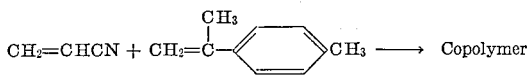

In a 3-liter, three-necked flask equipped with a condenser, stirrer and a gas inlet is placed 150 g. of acrylonitrile and 450 g. of isopropenyl toluene. To this mixture of acrylonitrile and isopropenyl toluene is added 1200 ml. of water, 1.2 g. of benzoyl peroxide and 0.4 g. of sodium thiosulfate followed by 40 g. of triethanol amine palmitamide.

The polymerization mixture is agitated vigorously and heated on the steam bath for about 14 hours, internal temperature being maintained at about 40–42° C. The mixture is then steam distilled to eliminate any unreacted monomeric materials and in this manner 225–250 g. of polymer is obtained as an emulsion.

This latex is effective as a coagulant for inorganic and organic aqueous suspensions.

EXAMPLE 21

Preparation of a vinyl chloride-vinyl acetate copolymer $$CH_2+CHCl+CH_2=CHOCOCH_3 \rightarrow Copolymer$$

Copolymerization of vinyl acetate with vinyl chloride is carried out in the following manner.

In a glass polymer tube is placed 100 ml. of water, about 5 g. of tricosylphenoxyoctethyleneglycol, 0.3 g. of azobisisobutyronitrile, 0.1 g. sodium pyrophosphate and 0.02 g. ferric sulfate. This mixture is cooled below the B.P. of vinyl chloride (−14° C.) with Dry Ice acetone bath. Five grams of vinyl acetate and 45 g. of vinyl chloride, measured by first condensing into a graduated vessel, are introduced into the pressure tube which is flushed with nitrogen and sealed. The pressure tube is allowed to warm to 40° C. and agitated for a period of 2 hours. The vessel is now cooled in ordinary ice water and opened affording a quantitative yield of the copolymer as an emulsion.

This latex is effective as a coagulant for inorganic and organic aqueous suspensions.

EXAMPLE 22

Emulsion polymerization of chloroprene

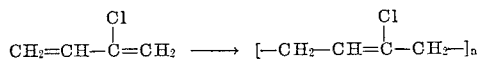

Emulsion polymerization of chloroprene is carried out according to the following procedure. 100 g. of freshly distilled chloroprene is added to 150 ml. of water containing 0.5 g. of cumene hydroperoxide, 0.1 g. sodium hydrogen phosphate and 10 g. of stearoyl ethanolamide.

The mixture is heated to 80° C., and the progress of the polymerization is followed by means of specific gravity changes. The density of the emulsion increases with time and polymerization may be considered complete when the specific gravity of the emulsion is between 1.068 and 1.070. Any excess monomer is decanted.

This latex is effective as a coagulant for inorganic and organic aqueous suspensions.

EXAMPLE 23

Emulsion copolymerization of butadiene

A mixture of 4.2 g. of nonylphenoxy triethylene glycol, 150 ml. of water and 0.2 g. of potassium peroxidisulfate (persulfate, $K_2S_2O_8$) was placed in a pressure bottle and frozen. Then 75 g. of butadiene, 9.5 g. of N-vinylpyrrolidone, 0.07 g. of potassium metabisulfite (pyrosulfite, $K_2S_2O_5$) and 0.10 ml. of dodecyl mercaptan were added. Five grams of butadiene was allowed to boil off to purge the bottle of air. The bottle was then sealed and agitated in a water bath, maintained at 30° C. for 16 hours, after which time the bottle was vented and the product removed as a milky-white, free-flowing emulsion.

This latex is effective as a coagulant for inorganic and organic aqueous suspensions.

EXAMPLE 24

The procedure of Example 23 was repeated with the exception that diethylaminoethyl acrylate was used as a comonomer instead of N-vinyl pyrrolidone. The latex product had the same appearance as that of Example 20 and was equally effective as a coagulant.

EXAMPLE 25

Ethylene/vinyl chloride emulsion copolymer 8.2 g. of nonylphenoxy triethyleneglycol was transformed into its acetate salt with glacial acetic acid and dissolved in 50 cc. of distilled water. The aqueous solution was placed in a 1 l. steel autoclave and pressurized to 1400 p.s.i.g. with ethylene. Then 147 cc. of vinyl chloride, 5 cc. of a solution of 3.85 g. of ammonium persulfate dissolved in 490 cc. of water and 70 cc. of a solution of 4.9 g. of sodium metabisulfite dissolved in 490 cc. of water were added. Additional vinyl chloride was added until the gas pressure reached 8000 p.s.i.g. The autoclave was rocked for 5 hours with the temperature being maintained at 30° C. with sufficient vinyl chloride being added to maintain the pressure at 8000 p.s.i.g. throughout the course of the reaction. A total of 235 g. of the desired product emulsion were isolated.

This latex is effective as a coagulant for inorganic and organic aqueous suspensions.

Various modifications will be apparent to one skilled in the art, and it is not intended that this invention be limited to the details in the specific examples presented by way of illustration. Accordingly, the scope of the invention is limited only by the appended claims.

We claim:

1. A process for treating water containing suspended matter to remove a portion of said suspended matter comprising: (a) adding to an influent of said water a nonionic synthetic organic latex flocculating agent, said latex being a water-based emulsion formed by the free radical-induced emulsion polymerization of $C_2$–$C_{30}$ olefins, $C_4$–$C_{30}$ dienes, or halogen-, ester- or aryl-substituted derivatives of said olefins or dienes, mixtures of said substituted or unsubstituted olefins or dienes with each other, mixtures of said substituted or unsubstituted olefins or dienes with up to an equimolar amount of an aliphatic dithiol, or mixtures of said substituted or unsubstituted olefins or dienes with up to 50 weight percent of a nitrogen-containing olefinic monomer, in the presence of water and a nonionic organic emulsifying agent; (b) permitting the concentration of a floc comprising said suspended matter and latex flocculating agent constituents into a substratum; and (c) separating said floc from said treated water.

2. A process in accordance with claim 1 wherein said flocculating agent is distributed substantially homogeneously throughout said water containing suspended matter.

3. A process in accordance with claim 1 wherein said separation is effected by decantation.

4. A process in accordance with claim 1 wherein said separation is effected by filtration.

5. A process in accordance with claim 1 wherein said water containing suspended matter is coal mine wash water.

6. A process in accordance with claim 1 wherein said water comprises an aqueous suspension of chlorinated polyethylene.

7. A process in accordance with claim 5 wherein said latex is added in an amount of from about 0.1 to about 20 parts by weight per million parts of water.

8. A process in accordance with claim 1 wherein said latex comprises polybutadiene and a $C_7$ to $C_{30}$ alkylphenoxy polyethyleneoxy ethanol.

9. A process in accordance with claim 1 wherein said latex comprises polybutadiene and a $C_7$ to $C_{30}$ fatty acid amide of a $C_2$ to $C_6$ alkanol amine.

References Cited

UNITED STATES PATENTS

| 3,142,638 | 7/1964 | Blaisdell et al. | 210—52 |
| 3,165,465 | 1/1965 | Ray et al. | 210—53 |
| 3,259,569 | 7/1966 | Priesing et al. | 210—53 X |
| 3,276,998 | 10/1966 | Green | 210—52 |

MICHAEL E. ROGERS, Primary Examiner

U.S. Cl. X.R.

260—29.6, 29.7